(12) United States Patent
Asai

(10) Patent No.: US 7,761,576 B2
(45) Date of Patent: Jul. 20, 2010

(54) PEER-TO-PEER COMMUNICATIONS SYSTEM AND COMPUTER READABLE MEDIUM

(75) Inventor: Arito Asai, Saitama (JP)

(73) Assignee: FujiFilm Corporation, Tokyo (JP)

(*) Notice: Subject to any disclaimer, the term of this patent is extended or adjusted under 35 U.S.C. 154(b) by 1166 days.

(21) Appl. No.: 10/866,714

(22) Filed: Jun. 15, 2004

(65) Prior Publication Data
US 2005/0005030 A1 Jan. 6, 2005

(30) Foreign Application Priority Data
Jul. 4, 2003 (JP) ............................. 2003-270960

(51) Int. Cl.
*G06F 15/16* (2006.01)
*G06F 15/173* (2006.01)
(52) U.S. Cl. ..................... 709/227; 709/229; 709/226
(58) Field of Classification Search ............... 709/237, 709/227, 223, 229, 226; 726/15
See application file for complete search history.

(56) References Cited

U.S. PATENT DOCUMENTS

| 5,944,823 | A * | 8/1999 | Jade et al. ..................... 726/15 |
| 6,301,618 | B1 * | 10/2001 | Sitaraman et al. ............ 709/227 |
| 6,310,941 | B1 * | 10/2001 | Crutcher et al. ........... 379/88.17 |
| 7,043,644 | B2 * | 5/2006 | DeBruine ..................... 713/153 |
| 7,097,562 | B2 * | 8/2006 | Gagner ........................ 463/42 |
| 7,227,868 | B2 * | 6/2007 | Inden ..................... 370/395.52 |
| 2003/0084162 | A1 * | 5/2003 | Johnson et al. ............. 709/227 |
| 2003/0105812 | A1 * | 6/2003 | Flowers et al. .............. 709/203 |
| 2004/0249911 | A1 * | 12/2004 | Alkhatib et al. ............. 709/223 |
| 2004/0260752 | A1 * | 12/2004 | Chandra et al. ............. 709/200 |
| 2007/0136480 | A1 * | 6/2007 | Stephenson et al. ......... 709/227 |

FOREIGN PATENT DOCUMENTS

JP 2003-101590 A 4/2003

OTHER PUBLICATIONS

Jp2003l0590 Transaction pp. 1-5.*

* cited by examiner

*Primary Examiner*—Karen C Tang
(74) *Attorney, Agent, or Firm*—Birch, Stewart, Kolasch & Birch, LLP

(57) ABSTRACT

A private network terminal device issues, to a repeating installation, a relay request for relaying a connection request. A global network terminal device connects with the repeating installation, to transmit the connection request. The repeating installation relays the connection request and relays communication between the terminal devices in an as-is manner. Here, the private network terminal device separately commences new connection with the global network terminal device through direct connection and transmits a replacement request for replacing the connection by way of the repeating installation with this direct connection. The global network terminal device transmits a disconnection request to the repeating installation. The private network terminal device disconnects communication with the repeating installation. The global network terminal device disconnects communication with the repeating installation, thereby commencing communication with the private network terminal device through direct connection. Subsequently, peer-to-peer communication is performed through use of the direct connection.

9 Claims, 3 Drawing Sheets

PEER-TO-PEER COMMUNICATIONS SYSTEM AND COMPUTER READABLE MEDIUM

This Non-provisional application claims priority under 35 U.S.C. §119(a) on Patent Application No(s). 2003-270960 filed in Japan on Jul. 4, 2003, the entire contents of which are hereby incorporated by reference.

BACKGROUND OF THE INVENTION

1. Field of the Invention

The present invention relates to a peer-to-peer communications system configured to enable pieces of terminal equipment to connect directly with each other, transfer data, and share information, as well as to terminal equipment constituting the communications system.

2. Description of the Related Art

A communications system of client-server type suffers a problem of heavy load being imposed on a server as a result of concentration of communication on the server. In order to solve this problem, attention has been paid to peer-to-peer communication by means of which pieces of terminal equipment communicate with each other.

Incidentally, a security problem of a network has emerged, and a device (hereinafter described as "NAT/Firewall") having the function of rejecting direct connection with subordinate devices from the outside, such as an NAT (Network Address Translation) or a firewall, is often interposed between the Internet and the piece of terminal equipment. However, when the NAT/Firewall is present, a piece of terminal equipment belonging to a network (hereinafter described as a "private network") located inside of the NAT/firewall can transfer data directly to a piece of terminal equipment located outside the NAT/Firewall, but the piece of terminal equipment located outside the NAT/Firewall cannot transfer data directly to the terminal equipment located within the private network (see FIG. 3). Pieces of terminal equipment located outside of the NAT/Firewall are assigned globally-unique global addresses, whereas pieces of terminal equipment located within the private network are assigned private addresses which are unique within the private network but might include overlaps from the worldwide viewpoint. Therefore, the pieces of terminal equipment located outside the private network cannot specify an address of the terminal equipment belonging to the private network. Therefore, it has been impossible to establish a peer-to-peer communications system which enables the pieces of terminal equipment located inside and outside the private network to directly transfer data or share information.

In order to solve the problem, there has been proposed a system which enables direct transfer of data from a piece of terminal equipment having a global address to a piece of terminal equipment having a private address by means of setting up a repeating installation (a communications control server) having a global address in the network outside of the private network. In this conventional system, all pieces of terminal equipment connect to the repeating installation, to thus acquire session information about themselves, such as data transfer requests, regardless of whether they are outside of or belong to a private network. After acquisition of the session information about themselves, the pieces of terminal equipment directly transfer data in accordance with the information while bypassing the communications control server (see JP-A-2003-101590).

SUMMARY OF THE INVENTION

However, according to the technique described in JP-A-2003-101590, all pieces of terminal equipment must connect to the repeating installation at all times or periodically to monitor session information about themselves, regardless of whether or not the pieces of terminal equipment belong to or are disposed outside a private network, and hence a heavy load is imposed on the repeating installation. Moreover, the pieces of terminal equipment having global addresses must connect to the repeating installation at all times or periodically to thus monitor session information about themselves, thereby inducing wasteful load over the entire network and rendering the network inefficient.

The present invention has been conceived to solve the above-described technical problem in the related-art technique and aims at providing a peer-to-peer communications system which enables pieces of terminal equipment belonging to or disposed outside a private network to connect directly with each other and transfer data while curbing load imposed on repeating installation and the entire network, as well as providing terminal equipment and a computer readable medium for realizing such a peer-to-peer communications system.

To achieve the object, according to the present invention, there is provided a peer-to-peer communications system comprising: a private network terminal device having only a private address and configured to generate a relay request for relaying a connection request to the private network terminal device; a global network terminal device having a first global address, the connection request being from the global network terminal device for connection with the private network terminal device; and a repeating installation having a second global address and configured to receive the relay request transmitted from the private network and the connection request transmitted from the global network terminal device, wherein the private network terminal device is directly connected with the global network terminal device after receiving the connection request to transmit, to the global network terminal device, are placement request for replacing a first communication via the repeating installation between the private network terminal device and the global network terminal device, with a second communication via a direct connection between the private network terminal and the global network terminal, and wherein, in response to a disconnection request for disconnecting the first communication with the repeating installation, transmitted by the global network terminal device after receiving said replacement request and subsequently received in the private network terminal device, said first communication with the repeating installation is disconnected and the second communication is commenced.

According to the present invention, there is also provided the peer-to-peer communications system, wherein the private network terminal transmits a disconnection request receipt acknowledgment to the global network terminal device in reply to the disconnection request and after receiving the disconnection request, and the global network terminal device disconnects the communication with the repeating installation after receiving the disconnection request receipt acknowledgment.

In the peer-to-peer communications system having the foregoing configuration, the private network terminal device transmits, to any of the pieces of the repeating installation, a connection request issued by the global network terminal device for connection with the private network terminal device. When there is a necessity for establishing connection with the private network terminal device, the global network terminal device transmits, to the repeating installation, a connection request for connection with the private network terminal device. The private network terminal device receives the connection request issued by the global network terminal device by way of the repeating installation. The private network terminal device connects directly with the global network terminal device, which is a sender of the connection request, after having received the connection request, to thus transmit a replacement request for replacing communication performed by way of the repeating installation with direct communication. Upon receipt of the replacement request from the private network terminal, the global network terminal device transmits a request for disconnecting communication with the repeating installation to the private network terminal which is the sender of the replacement request. Upon receipt of the request for disconnecting communication with the repeating installation from the global network terminal, which is the sender of the replacement request, the private network terminal device transmits a receipt acknowledgment in reply to the disconnection request to the global network terminal device, which is a sender of the disconnection request, to thus disconnect communication with the repeating installation. After having received the receipt acknowledgment, the global network terminal disconnects connection with the repeating installation and commences communication with the private network terminal device, which is a sender of the receipt acknowledgment, through direct communication.

Therefore, according to the peer-to-peer communications system, the terminal devices do not all need to connect with repeating installation at all times or periodically to monitor session information about themselves, which has been required by the foregoing related-art system. Hence, load imposed on the repeating installation can be curbed as compared with the case of the related-art system. Further, the global network terminal does not need to connect with the repeating installation to monitor session information about itself. After direct connection has been established between the private network terminal device and the global network terminal device, both the private and global network terminal devices disconnect communication with the repeating installation. Hence, load imposed on the entire network can be greatly lessened as compared with the case of the related-art system, to thus improve system efficiency.

According to the present invention, there is provided a private network terminal device for a peer-to-peer communications system that includes the private network terminal device having only a private address, a global network terminal device having a first global address, and a repeating installation having a second global address, wherein the private network terminal device, transmits, to the repeating installation, a relay request for relaying a connection request to the private network terminal device, the connection request issued by the global network terminal device for connection with the private network terminal device; receives the connection request via the repeating installation; directly connects with the global network terminal device after receiving the connection request, to transmit, to the global network terminal device, a replacement request for replacing a first communication via the repeating installation between the private network terminal device and the global network terminal device, with a second communication via a direct connection between the private network terminal device and the global network terminal device; receives, from the global network terminal device, a disconnection request for disconnecting the first communication; and disconnects the first communication with the repeating installation after receiving the disconnection request.

According to the present invention, there is also provided the private network terminal device, wherein the private network terminal device transmits, to the global network terminal device, a receipt acknowledgment in reply to the received disconnection request.

The private network terminal device having the foregoing configuration transmits, to any of the repeating installations, a connection request issued by the global network terminal device for connection with the private network terminal device. Upon receipt of the connection request from the global network terminal device, the private network terminal device connects directly with the global network terminal device, which is a sender of the connection request, to thus transmit a replacement request for replacing communication performed by way of the repeating installation with direct communication. Upon receipt, from the global network terminal device which is a sender of the replacement request, a disconnection request for disconnecting communication with the repeating installation, the private network terminal device transmits a receipt acknowledgment in reply to the disconnection request to the global network terminal device, which is a sender of the disconnection request, to thus disconnect communication with the repeating installation.

Therefore, according to this private network terminal device, a peer-to-peer communications system—which enables terminal devices disposed inside and outside of the private network system to connect directly with each other to transfer data while curbing loads imposed on the repeating installation and the entire network—can be implemented, by means of establishing a peer-to-peer communications system along with the global network terminal device, wherein the global network terminal device has the functions of transmitting to the repeating installation a connection request for connection with the private network terminal device; transmitting a disconnection request for disconnecting communication with the repeating installation to the private network terminal device, which is a sender of the replacement request, after having received the replacement request from the private network terminal device; and disconnecting communication with the repeating installation after having received the receipt acknowledgment, thereby commencing communication with the private network terminal device, which is a sender of the receipt acknowledgment, through direct connection.

According to the invention, there is provided a global network terminal device for a peer-to-peer communications system that includes a private network terminal device having only a private address, the global network terminal device having a first global address, and a repeating installation having a second global address, wherein the global network terminal device, transmits, from the global network terminal device to the repeating installation, a connection request for connection with the private network terminal device; receives, from the private network terminal device, a replacement request for replacing a first communication via the repeating installation between the private network terminal device and the global network terminal device, with a second communication by way of a direct connection between the private network terminal device and the global network terminal device; transmits, to the private network terminal device, a disconnection request for disconnecting a communication with the repeating installation after receiving the replacement request; and disconnects the first communication with the repeating installation and commences the second communication.

According to the present invention, there is also provide the global network terminal device, wherein the first communication is disconnected from the repeating installation after the global network terminal device receives a receipt acknowledgment from the private network terminal device in reply to the disconnection request.

When there is a necessity for establishing connection with the private network terminal device, the global network terminal device having the foregoing configuration transmits to the repeating installation a connection request for connection with the private network terminal device. Upon receipt, from the private network terminal device, of the replacement request for replacing communication performed by way of the repeating installation with direct communication, the global network terminal device transmits a disconnection request for disconnecting communication with the repeating installation to the private network terminal device, which is a sender of the replacement request. Upon receipt of the receipt acknowledgment in reply to the disconnection request, the global network terminal device disconnects communication with the repeating installation, thereby commencing communication with the private network terminal device, which is a sender of the receipt acknowledgment, through direct connection.

Therefore, according to this global network terminal device, a peer-to-peer communications system—which enables terminal devices disposed inside and outside of the private network system to connect directly with each other to transfer data while curbing loads imposed on the repeating installations and the entire network—can be implemented, by means of establishing a peer-to-peer communications system along with a private network terminal device, wherein the private network terminal device has the functions of: transmitting, to any of the repeating installations, a connection request issued by the global network terminal device for connection with the private network terminal device; directly connecting with the global network terminal device, which is a sender of the connection request, after having received the connection request from the global network terminal device, to thus transmit a replacement request for replacing communication performed by way of the repeating installation with direct communication; and, upon receipt from the global network terminal device—which is a sender of the replacement request—of a disconnection request for disconnecting communication with the repeating installation, transmitting a receipt acknowledgment in reply to the disconnection request to the global network terminal device, which is a sender of the disconnection request, to thus disconnect communication with the repeating installation.

According to the present invention, there is provided a computer-readable medium comprising a set of instructions for achieving the private network terminal device of the present invention. The private network terminal can be embodied by installing a program corresponding to the set of instructions.

In other words, there is provided a computer readable medium containing a set of instructions, executable by a private network terminal having only a private address, for communication in a peer-to-peer communications system including the private network terminal, a global network terminal device having a first global address, and a repeating installation having a second global address, the set of instructions comprising: transmitting to the repeating installation a relay request for relaying to the private network terminal device a connection request issued by the global network terminal device for connection with the private network terminal device; receiving the connection request from the global network terminal device via the repeating installation; directly connecting with the global network terminal device after receiving the connection request, to transmit to the global network terminal device a replacement request for replacing a first communication via the repeating installation between the private network terminal device and the global network terminal device, with a second communication via a direct connection between the private network terminal device and the global network terminal device; and disconnecting the first communication in response to a disconnection request for disconnecting the first communication received from the global network terminal device.

According to the present invention, there is also provided a computer-readable medium comprising a set of instructions for achieving the global network terminal device of the present invention. The global network terminal can be embodied by installing a program corresponding to the set of instructions.

According to the present invention, there is also provided a computer readable medium containing a set of instructions executable by a global network terminal device having a first global address, for communication in a peer-to-peer communications system that includes a private network terminal device having only a private address, the global network terminal device, and a repeating installation having a second global address, the set of instructions comprising: generating and transmitting to the repeating installation a connection request for connection with the private network terminal device; in response to a replacement request from the private network terminal for replacing a first communication via the repeating installation between the private network terminal device and the global network terminal device with a second communication via a direct connection between the private network terminal device and said global network terminal device, transmitting to the private network terminal device a disconnection request for disconnecting the first communication; and disconnecting the first communication and commencing the second communication.

According to the present invention, there is provided a method of communication in a peer-to-peer network including a private network terminal device having, a global network terminal device and a repeating installation, the method comprising: (a) creating a standby condition for receiving a connection request in the private network terminal device; (b) in response to the connection request transmitted by an indirect connection from the global network terminal device to the private network terminal device via the repeating installation, establishing a direct connection between the private network terminal device and the global network terminal device; (c) requesting disconnection of the indirect connection based on a replacement request from the private network terminal device to the global network terminal device via the direct connection; (d) in response to said (c), disconnecting the private network terminal device and the global network terminal device from the repeating installation; and (e) performing direct communication between the private network terminal device and the global network terminal device via said direct connection.

According to the present invention, there is also provided the method, wherein said (a) includes creating the standby condition in the private network terminal device based on a relay request receipt acknowledgment from the repeating installation generated in response to a relay request for relay of a connection request from the global network terminal device; said (c) includes, in response to the replacement request, transmitting a disconnection request from the global network terminal device to the private network terminal device via the repeating installation; and said (d) includes transmitting a disconnection request receipt acknowledgment from the private network terminal device to the repeating installation based on the disconnection request and then disconnecting the private network terminal device from the repeating installation, and forwarding the disconnection request receipt acknowledgment from the repeating installation to the global network terminal device and then disconnecting the global network terminal device from the repeating installation.

DETAILED DESCRIPTION OF THE INVENTION

An embodiment of the invention will be described hereinbelow by reference to the accompanying drawings.

Figure 1:
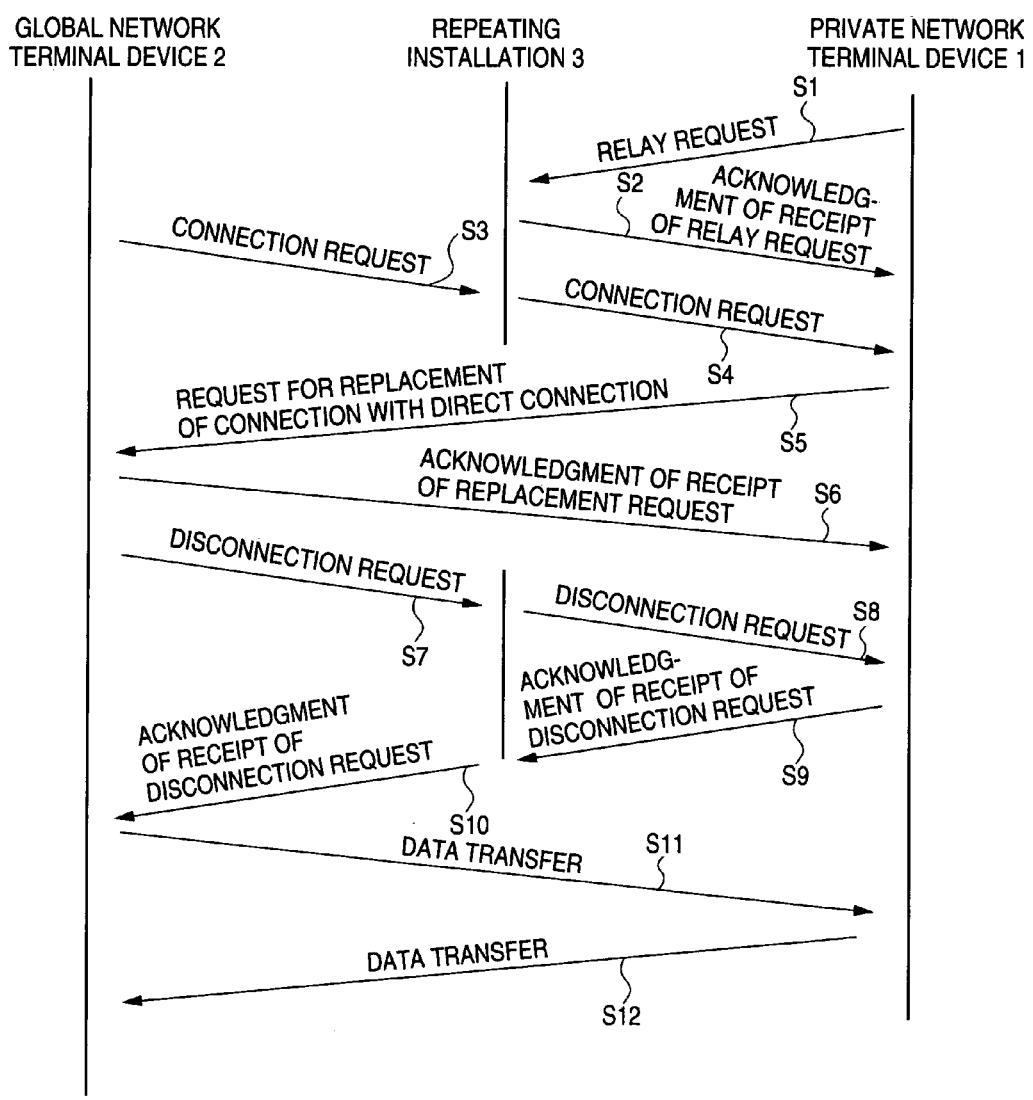
FIG. 1 is a sequence diagram illustrating operation procedures to be performed in a peer-to-peer communications system according to the invention.

FIG. 1 is a sequence diagram illustrating operation procedures of a peer-to-peer communications system according to the present invention. This diagram shows operation procedures to be performed when a certain private network terminal device 1 and a certain global network terminal device 2 effect communication in a peer-to-peer manner. Arrows in the drawings depict TCP (Transmission Control Protocol) connection. The private network terminal device 1 is subordinate to an NAT/Firewall (see FIG. 2), and the global network terminal device 2 is a device connected directly to the Internet. The terminal devices 1, 2 are embodied by means of a general-purpose computer (e.g., a personal computer) capable of connecting with the Internet. In addition, each of the terminal devices 1, 2, includes a computer-readable medium or a data carrier that contains a set of instructions for achieving a peer-to-peer communications according to the method of the present invention described herein (preferably as being installed with a peer-to-peer communications program corresponding to the set of instructions). A repeating installation 3 is an apparatus which is connected directly to the Internet and is used temporarily when the private network terminal device 1 and the global network terminal device 2 start peer-to-peer communication. Any of the global network terminal devices other than the global network terminal device 2, all being connected directly to the Internet, may serve as the repeating installation 3.

Figure 3:
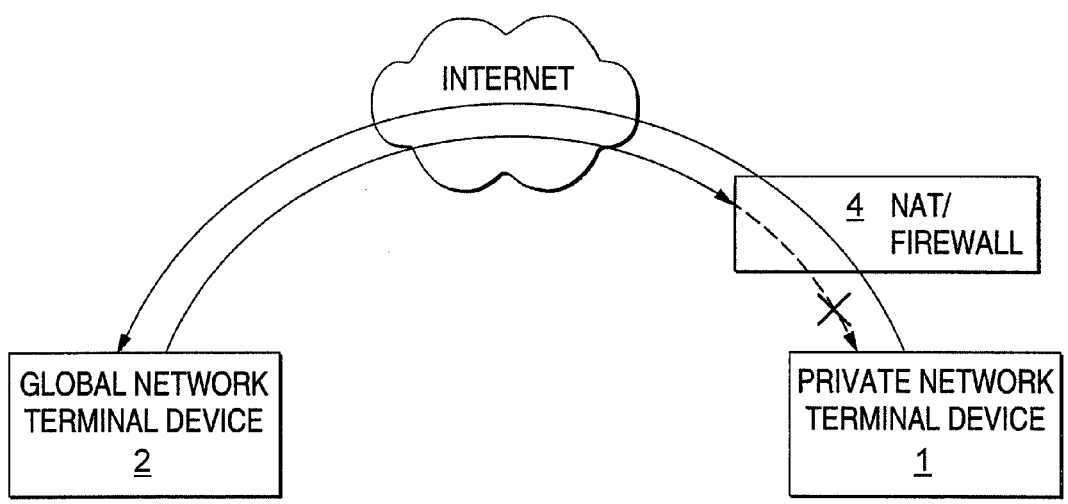
FIG. 3 is a descriptive view showing that direct transfer of data from a private network to an external terminal device is possible but direct transfer of data to an internal terminal device from the outside of the private network is impossible.

Since the private network terminal 1 is subordinate to the NAT/Firewall, a TCP connection request (hereinafter simply described as a "connection request"), which has been issued by a device outside the NAT/Firewall toward the private network terminal device 1, is rejected (see FIG. 3). Therefore, the private network terminal device 1 cannot receive a connection request from the outside. In contrast, the global network terminal device 2 is not subordinate to the NAT/Firewall and hence can receive a connection request from the outside.

Therefore, the private network terminal device 1 has previously issued a request for relay of a connection request from the global network terminal device to the private network terminal device 1 itself. Specifically, the private network terminal device 1 transmits a relay request to the repeating installation 3 (S1) and receives from the repeating installation 3 a receipt acknowledgment (relay request receipt acknowledgment) to the relay request (S2). Thereby, the private network terminal device 1 enters a standby condition for a waiting a connection request from the global network terminal device.

Figure 2A:
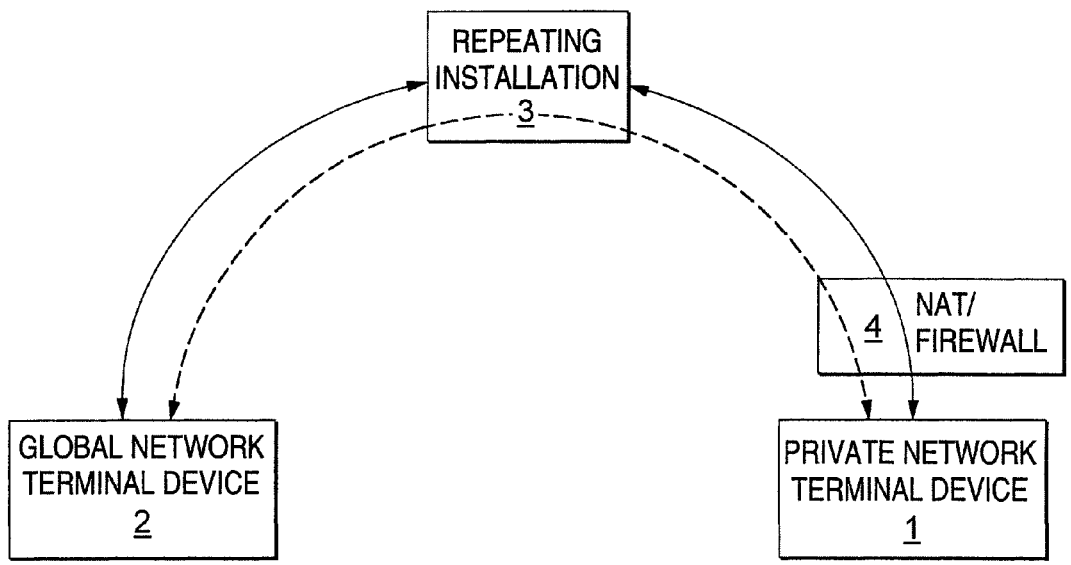
FIG. 2A is a descriptive view of the status of communication established between a private network terminal device and a global network terminal device, in which the communication between the terminal devices is relayed by a repeating installation.

The global network terminal device 2 that desires to establish peer-to-peer communication with the private network terminal device 1 connects with the repeating installation 3 in place of the private network terminal device 1, thereby transmitting a connection request to the private network terminal device 1 (S3). The repeating installation 3 transmits the connection request from the global network terminal device 2 to the private network terminal device 1 (S4), thereby relaying the communication established between the terminal devices 1, 2. FIG. 2A shows the state achieved at this time.

Here, the private network terminal device 1 separately commences new connection (TCP connection) directly with the global network terminal device 2. Since the global network terminal device 2 is not subordinate to the NAT/Firewall, connection becomes successful. The private network terminal 1 transmits, to the global network terminal 2, a replacement request for requesting replacement of the connection already established by way of the repeating installation 3 with the direct connection (S5).

Upon receipt of the replacement request from the private network terminal device 1, the global network terminal device 2 returns a receipt acknowledgment (replacement request receipt acknowledgment) (S6) and then transmits a request for disconnecting communication with the repeating installation 3 to the private network terminal device 1 by way of the repeating installation 3 (S7).

Upon receipt of the disconnection request from the global network terminal device 2 (S8), the private network terminal device 1 transmits a receipt acknowledgment (disconnection request receipt acknowledgment) in reply to the disconnection request to the global network terminal device 1 by way of the repeating installation 3 (S9) and then immediately disconnects communication with the repeating installation 3.

Figure 2B:
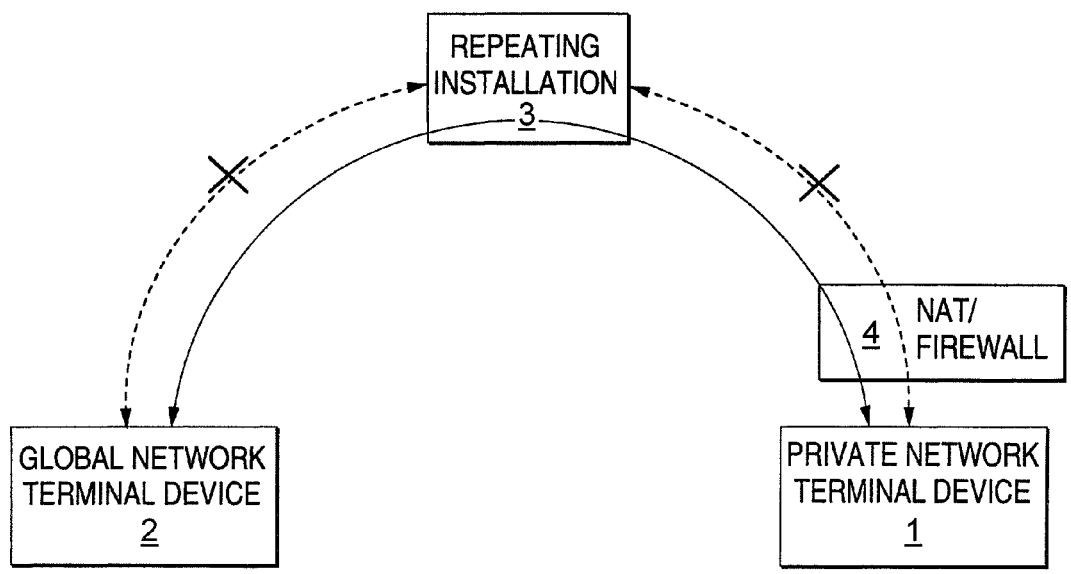
FIG. 2B is a descriptive view of the status of communication established between a private network terminal device and a global network terminal device, in which communication is performed in a peer-to-peer manner through use of the direct connection established between the terminal devices.

Upon receipt of the receipt acknowledgment from the private network terminal device 1 (S10), the global network terminal device 2 disconnects communication with the repeating installation 3, thereby commencing communication by means of direct connection with the private network terminal device 1. Subsequently, communication is performed in a peer-to-peer manner through use of the direct connection established between the terminal devices 1, 2 (S11, S12). FIG. 2B shows the state achieved at this time.

According to the system of this embodiment, the repeating installation 3 is used only when the private network terminal device 1 and the global network terminal device 2 exchange information required to commence peer-to-peer communication. After direct connection has been established between the terminal devices 1, 2, both the terminal devices 1 and 2 disconnect communication with the repeating installation 3.

Hence, terminal devices belonging to and installed outside the private network can connect directly with each other, to thus transfer data. Moreover, the global network terminal device 2 does not need to connect with the repeating installation 3 at all times or periodically, to thus monitor session information about itself. Hence, the load imposed on the global network terminal device can also be curbed.

In order to simplify descriptions, FIGS. 1, 2A and 2B show only one private network terminal device 1 and one global network terminal device 2. However, even when there are a plurality of terminal devices 1 and 2 or there are a plurality of either terminal devices 1 or 2, the repeating installation 3 is used only at the time of exchange of information required to commence peer-to-peer communication between the terminal devices 1, 2. Therefore, the load imposed on the repeating installation 3 does not become heavy, and the load imposed on the entire network can be reduced significantly as compared with the related-art system. When there are a numerous terminal devices 1, 2, a plurality of repeating installations 3 are prepared to disperse processing, thereby lessening the loads imposed on the respective repeating installations 3.

In the embodiment shown in FIG. 1, the global network terminal device 1 returns a receipt acknowledgment to the replacement request issued by the private network terminal device 2 for requesting replacement of connection with direct connection. However, return of this receipt acknowledgment can be omitted. Specifically, when the request for replacing connection with direct connection has been received, a request for disconnecting communication with the repeating installation 3 may be immediately transmitted to the private network terminal device 1.

The private network terminal device 1 returns a receipt acknowledgment in reply to the request issued by the global network terminal device 2 for disconnecting connection with the repeating installation 3. However, return of this receipt acknowledgment can also be omitted. Specifically, when the request for disconnecting connection with the repeating installation 3 has been received, communication with the repeating installation 3 may be disconnected immediately without returning a receipt acknowledgment.

As has been described, the peer-to-peer communications system of the invention enables realization of a peer-to-peer communications system which enables pieces of terminal equipment belonging to or disposed outside a private network to connect directly with each other and transfer data while curbing load imposed on the repeating installations and the entire network.

The private network terminal equipment and the global network terminal equipment, both belonging to the present invention, enable realization of a peer-to-peer communications system which enables pieces of terminal equipment belonging to or disposed outside a private network to connect directly with each other and transfer data while curbing load imposed on the repeating installations and the entire network.

The program of the invention enables easy realization of the private network terminal equipment and the global network terminal equipment, both pertaining to the invention, through use of a computer.

The entire disclosure of each and every foreign patent application from which the benefit of foreign priority has been claimed in the present application is incorporated herein by reference, as if fully set forth.

What is claimed is:

1. A peer-to-peer communications system comprising:
   a private network terminal device having only a private address;
   a global network terminal device having a first global address; and
   a repeating installation device having a second global address, wherein the private network terminal device is configured to generate a relay request to be transmitted to the repeating installation device to instruct the repeating installation device to relay a subsequent connection request to the private network terminal device, wherein the connection request is initially sent from the global network terminal device to the repeating installation device to request connection with the private network terminal device, and wherein the repeating installation device is configured to receive the relay request transmitted from the private network and the connection request transmitted from the global network terminal device, wherein the private network terminal device is directly connected with the global network terminal device after receiving the connection request to transmit, to the global network terminal device, a replacement request for replacing a first communication via the repeating installation device between the private network terminal device and the global network terminal device, with a second communication via a direct connection between the private network terminal device and the global network terminal device in which the private network terminal device and the global network terminal device do not communicate further with the repeating installation device, wherein, in response to a disconnection request for disconnecting the first communication with the repeating installation device, transmitted by the global network terminal device after receiving said replacement request and subsequently received in the private network terminal device, said first communication with the repeating installation device is disconnected and the second communication is commenced, and wherein the repeating installation device relays the connection request to the private network terminal device when the repeating installation device receives the connection request from the global network terminal device, and wherein the repeating installation transmits the disconnection request to the private network terminal device when the repeating installation device receives the disconnection request from the global network terminal device, wherein the repeating installation device is temporally used only when the private network terminal device connects the global network terminal device.

2. The peer-to-peer communications system according to claim 1, wherein the private network terminal transmits a disconnection request receipt acknowledgment to the global network terminal device in reply to the disconnection request and after receiving the disconnection request, and the global network terminal device disconnects the communication with the repeating installation device after receiving the disconnection request receipt acknowledgment.

3. An apparatus, comprising: a private network terminal device for a peer-to-peer communications system that includes the private network terminal device having only a private address, a global network terminal device having a first global address, and a repeating installation device having a second global address, wherein the private network terminal device, transmits, to the repeating installation device, a relay request for relaying a connection request to the private network terminal device, the connection request issued by the global network terminal device for connection with the private network terminal device; receives the connection request via the repeating installation device; directly connects with the global network terminal device after receiving the connection request, to transmit, to the global network terminal device, a replacement request for replacing a first communication via the repeating installation device between the private network terminal device and the global network terminal device, with a second communication via a direct connection between the private network terminal device and the global network terminal device in which the private network terminal device and the global network terminal device do not communicate further with the repeating installation device; receives, from the global network terminal device, a disconnection request for disconnecting the first communication; and disconnects the first communication with the repeating installation device after receiving the disconnection request, wherein the repeating installation device transmits the connection request to the private network terminal device when the repeating installation device receives the connection request from the global network terminal device, and wherein the repeating installation transmits the disconnection request to the private network terminal device when the repeating installation device receives the disconnection request from the global network terminal device, wherein the repeating installation device is temporally used only when the private network terminal device connects the global network terminal device.

4. The private network terminal device according to claim 3, wherein the private network terminal device transmits, to the global network terminal device, a receipt acknowledgment in reply to the received disconnection request.

5. A method as claimed in claim 1, further comprising: assigning a special type indicator to the data packet message when the size of the data packet message is less than the predetermined maximum size, wherein the transmitting of the data packet message over the reservation channel further comprises transmitting the special type indicator along with the data packet message.

6. An apparatus, comprising: a global network terminal device for a peer-to-peer communications system that includes a private network terminal device having only a private address, the global network terminal device having a first global address, and a repeating installation device having a second global address, wherein the global network terminal device, transmits, from the global network terminal device to the repeating installation device, a connection request for connection with the private network terminal device; receives, from the private network terminal device, a replacement request for replacing a first communication via the repeating installation device between the private network terminal device and the global network terminal device, with a second communication by way of a direct connection between the private network terminal device and the global network terminal device in which the private network terminal device and the global network terminal device do not communicate further with the repeating installation device; transmits, to the private network terminal device, a disconnection request for disconnecting a communication with the repeating installation device after receiving the replacement request; and disconnects the first communication with the repeating installation device and commences the second communication, wherein the repeating installation device transmits the connection request to the private network terminal device when the repeating installation device receives the connection request from the global network terminal device, and wherein the repeating installation transmits the disconnection request to the private network terminal device when the repeating installation device receives the disconnection request from the global network terminal device, wherein the repeating installation device is temporally used only when the private network terminal device connects the global network terminal device.

7. A non-transitory computer readable medium containing a set of instructions, executable by a private network terminal having only a private address, for communication in a peer-to-peer communications system including the private network terminal, a global network terminal device having a first global address, and a repeating installation device having a second global address, wherein the set of instructions when read by a processor cause the processor to execute a method comprising: transmitting to the repeating installation device a relay request for relaying to the private network terminal device a connection request issued by the global network terminal device for connection with the private network terminal device; receiving the connection request from the global network terminal device via the repeating installation device; directly connecting with the global network terminal device after receiving the connection request, to transmit to the global network terminal device a replacement request for replacing a first communication via the repeating installation device between the private network terminal device and the global network terminal device, with a second communication via a direct connection between the private network terminal device and the global network terminal device in which the private network terminal device and the global network terminal device do not communicate further with the repeating installation device; and disconnecting the first communication in response to a disconnection request for disconnecting the first communication received from the global network terminal device, wherein the repeating installation device transmits the connection request to the private network terminal device when the repeating installation device receives the connection request from the global network terminal device, and wherein the repeating installation transmits the disconnection request to the private network terminal device when the repeating installation device receives the disconnection request from the global network terminal device, wherein the repeating installation device is temporally used only when the private network terminal device connects the global network terminal device.

8. A non-transitory computer readable medium containing a set of instructions executable by a global network terminal device having a first global address, for communication in a peer-to-peer communications system that includes a private network terminal device having only a private address, the global network terminal device, and a repeating installation device having a second global address, wherein the set of instructions when read by a processor cause the processor to execute a method comprising: generating and transmitting to the repeating installation device a connection request for connection with the private network terminal device; in response to a replacement request from the private network terminal for replacing a first communication via the repeating installation between the private network terminal device and the global network terminal device with a second communication via a direct connection between the private network terminal device and said global network terminal device that bypasses the repeating installation device, transmitting to the private network terminal device a disconnection request for disconnecting the first communication; and disconnecting the first communication and commencing the second communication, wherein the repeating installation device transmits the connection request to the private network terminal device when the repeating installation device receives the connection request from the global network terminal device, and wherein the repeating installation transmits the disconnection request to the private network terminal device when the repeating installation device receives the disconnection request from the global network terminal device, wherein the repeating installation device is temporally used only when the private network terminal device connects the global network terminal device.

9. A method of communication in a peer-to-peer network including a private network terminal device, a global network terminal device, and a repeating installation device, the method comprising: (a) creating a standby condition for receiving a connection request in the private network terminal device; (b) in response to the connection request transmitted by an indirect connection from the global network terminal device to the private network terminal device via the repeating installation device wherein the repeating installation device transmits the connection request to the private network terminal device when the repeating installation device receives the connection request from the global network terminal device, establishing a direct connection between the private network terminal device and the global network terminal device in which the private network terminal device and the global network terminal device do not communicate further with the repeating installation device; (c) requesting disconnection of the indirect connection based on a replacement request from the private network terminal device to the global network terminal device via the direct connection, wherein the repeating installation transmits a disconnection request to the private network terminal device when the repeating installation device receives the disconnection request from the global network terminal device; (d) in response to said (c), disconnecting the private network terminal device and the global network terminal device from the repeating installation device; and (e) performing direct communication between the private network terminal device and the global network terminal device via said direct connection, wherein the repeating installation device is temporally used only when the private network terminal device connects the global network terminal device; wherein said (a) includes creating the standby condition in the private network terminal device based on a relay request receipt acknowledgment from the repeating installation device generated in response to a relay request for relay of a connection request from the global network terminal device; and said (d) includes transmitting a disconnection request receipt acknowledgment from the private network terminal device to the repeating installation device based on the disconnection request and then disconnecting the private network terminal device from the repeating installation device, and forwarding the disconnection request receipt acknowledgment from the repeating installation to the global network terminal device and then disconnecting the global network terminal device from the repeating installation device.

* * * * *